[54] HYDROGENATED BLOCK COPOLYMER COMPOSITIONS

[75] Inventors: Yoshikuni Akiyama, Yokohama; Yasushi Kishimoto, Kawasaki; Ken Mizushiro, Fuchu; Hideo Morita, Yokahama, all of Japan

[73] Assignee: Asahi Kasei Kogyo Kabushiki Kaisha, Osaka, Japan

[21] Appl. No.: 886,601

[22] Filed: Jul. 18, 1986

[30] Foreign Application Priority Data

| | | |
|---|---|---|
| Jul. 19, 1985 [JP] | Japan | 60-158364 |
| Jul. 25, 1985 [JP] | Japan | 60-162964 |
| Aug. 28, 1985 [JP] | Japan | 60-187425 |
| Feb. 28, 1986 [JP] | Japan | 61-41979 |

[51] Int. Cl.$^4$ .................. C08L 51/00; C08L 71/04
[52] U.S. Cl. .................. 524/504; 524/474; 524/508; 525/92; 525/905
[58] Field of Search ............ 525/92, 905; 524/474, 524/505, 508

[56] References Cited

U.S. PATENT DOCUMENTS

| | | | |
|---|---|---|---|
| 3,306,874 | 2/1967 | Hay | 528/212 |
| 4,081,424 | 3/1978 | Gergen et al. | |
| 4,145,377 | 3/1979 | Bussink et al. | 525/89 |
| 4,166,055 | 8/1979 | Lee, Jr. | 525/92 |
| 4,239,673 | 12/1980 | Lee, Jr. | 525/84 |
| 4,383,082 | 5/1983 | Lee, Jr. | 525/92 |
| 4,563,500 | 1/1986 | Haaf et al. | 525/905 |

FOREIGN PATENT DOCUMENTS

| | | | |
|---|---|---|---|
| 0115712 | 8/1984 | European Pat. Off. | 525/92 |
| 7410861 | 2/1975 | Netherlands | 525/92 |

*Primary Examiner*—Jacob Ziegler
*Attorney, Agent, or Firm*—Birch, Stewart, Kolasch & Birch

[57] ABSTRACT

A composition having a composition containing substantially no other engineering thermoplastic resin and a compression set (JIS K 6301; 100° C.×22 hours; and compressibility, 25%) of 65% or less as rubber which comprises:

(a) 100 parts by weight of a hydrogenated block copolymer obtained by hydrogenating a block copolymer comprising at least two polymer blocks A composed mainly of a vinyl-substituted aromatic hydrocarbon and at least one polymer block B composed mainly of a conjugated diene, (b) 11 to 233 parts by weight of a homopolymeric and/or copolymeric polyphenylene ether resin comprising a binding unit represented by the general formula,

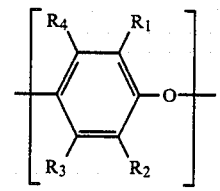

wherein $R_1$, $R_2$, $R_3$ and $R_4$, which may be the same or different, represent substituents selected from the group consisting of hydrogen, halogen, hydrocarbon groups and substituted hydrocarbon groups, and having a reduced viscosity in a range of from 0.15 to 0.70 as measured at 30° C. in a 0.5 g/dl chloroform solution, (c) 10 to 500 parts by weight of a non-aromatic softening agent for rubber, and (d) 5 to 150 parts by weight of a polyolefin resin and/or a polystyrene resin.

19 Claims, No Drawings

HYDROGENATED BLOCK COPOLYMER COMPOSITIONS

The present invention relates to hydrogenated block copolymer compositions which are rich in flexibility, superior in high-temperature (100° C.) compression set, mechanical strength and moldability, have the same degree of excellent oil resistance as that of chloroprene vulcanized rubber, and which can be used as a molding material for various molded products.

In recent years, thermoplastic elastomers which are a rubber-like soft material, requiring no vulcanization, and have moldability like thermoplastic resins, are finding applications in the fields of automobile parts, household electric appliance parts, electric wire-protecting materials, medical appliance parts, miscellaneous goods, footwears, etc. As to these thermoplastic elastomers, there are some proposals about elastomer compositions containing the hydrogenated product of vinyl-substituted aromatic hydrocarbon/conjugated diene block copolymers (hereinafter referred to as hydrogenated block copolymer). For example, U.S. Pat. Nos. 3,830,767 and 4,006,116 and Japanese Patent Application No. 88,738/1982 disclose elastomer compositions comprising the hydrogenated block copolymer, a hydrocarbon oil and an olefin polymer. Also, Japanese Patent Application Nos. 115,543/1982 and 6,065/1983 disclose compositions having an improved high-temperature compression set as rubber elastomers produced by the partial crosslinking of elastomer compositions, obtained by combining the hydrogenated block copolymer, a hydrocarbon oil, a polyolefin resin and an inorganic filler, in the presence of an organic peroxide and a crosslinking assistant.

Further, U.S. Pat. Nos. 4,145,377, 4,563,500, 4,166,055, 4,239,673 and 4,383,082, E.P. Publication No. 115,712 and Dutch Patent No. 7,410,861 disclose compositions comprising the hydrogenated block copolymer and a polyphenylene ether resin which are an essential component, a polyolefin resin and a polystyrene resin. The object of these proposals is however an improvement in resin compositions, and the compositions substantially obtained are a thermoplastic resin, giving no thermoplastic elastomer compositions.

Similarly, U.S. Pat. Nos. 4,081,424, 4,102,854, 4,107,130 and 4,110,303 disclose compositions comprising hydrogenated block copolymer/engineering thermoplastic resin compositions produced by combining the hydrogenated block copolymer, a polyolefin resin and an engineering thermoplastic resin, all of which are an essential component, and if necessary, a hydrocarbon oil and a polyphenylene ether resin which is a viscosity regulating agent. The compositions proposed in these patents are thermoplastic resins or thermoplastic elastomers, but the compression set at 100° C. of said elastomers is 65% or more, these compositions being not said to give rubber-like elastomers superior in thermal resistance.

Also, W.P. Publication No. 81/02020 discloses high-impact polyphenylene compositions comprising a polyphenylene ether resin, the hydrogenated block copolymer and an oil. The compositions obtained here provided thermoplastic resins having a good processability, but could not substantially provide thermoplastic elastomers superior in processability as well as compression set at 100° C.

As described above, the hydrogenated block copolymer compositions according to the prior arts having excellent high-temperature compression set are crosslinked products comprising the hydrogenated block copolymer, a softening agent for rubber and a polyolefin resin, requiring a complicated crosslinking step and complicated control of the step.

The present applicants applied for a patent on a hydrogenated block copolymer composition comprising the hydrogenated block copolymer, a polyolefin resin and a polyphenylene ether resin which can be produced by simple blending techniques as compared with the prior arts and also has improved processability and compression set (Japanese Patent Application No. 158,364/1985).

At present, these hydrogenated block copolymer-based thermoplastic elastomers according to the prior arts have a high-temperature (100° C.) compression set of 65% or more, not reaching the level of high-temperature compression set so far required for vulcanized rubber application, and besides, an improvement in the oil resistance increases the compression set, and vice versa. Consequently, hydrogenated block copolymer-based thermoplastic elastomer compositions which can be molded repeatedly, but do not lose the excellent high-temperature (100° C.) compression set and oil resistance, could not be obtained by the prior art.

The present invention was made to solve the above problems which could not readily be solved with the conventional molding materials for elastomers. Particularly, it was found that thermoplastic elastomer compositions which can be processed easily and used repeatedly, and yet which are superior in high-temperature (100° C.) compression set and have the same degree of excellent oil resistance as that of chloroprene vulcanized rubber, can be obtained by a simple blending technique.

The present invention provides a hydrogenated block copolymer composition having a composition containing substantially no other engineering thermoplastic resin and a compression set (JIS K 6301; 100° C.×22 hours; and compressibility, 25%) of 65% or less as rubber which comprises:

(a) 100 parts by weight of a hydrogenated block copolymer obtained by hydrogenating a block copolymer comprising at least two polymer blocks A composed mainly of a vinyl-substituted aromatic hydrocarbon and at least one polymer block B composed mainly of a conjugated diene, (b) 11 to 233 parts by weight of a homopolymeric and/or copolymeric polyphenylene ether resin comprising a binding unit represented by the general formula,

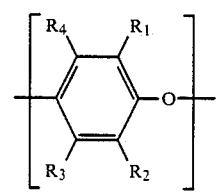

wherein $R_1$, $R_2$, $R_3$ and $R_4$, which may be the same or different, represent substituents selected from the group consisting of hydrogen, halogen, hydrocarbon groups and substituted hydrocarbon groups, and having a reduced viscosity in a range of from 0.15 to 0.70 as measured at 30° C. in a 0.5 g/dl chloroform solution, (c) 10 to 500 parts by weight of a non-aromatic softening agent for rubber, and (d) 5 to 150 parts by weight of a polyolefin resin and/or a polystyrene resin.

The present invention will be illustrated in detail.

In the present invention, the hydrogenated block copolymer used as the component (a) is obtained by hydrogenating a block copolymer comprising at least two polymer blocks A composed mainly of a vinyl-substituted aromatic hydrocarbon and at least one polymer block B composed mainly of a conjugated diene. This hydrogenated block copolymer has the polymer structure of hydrogenated products of vinyl-substituted aromatic hydrocarbon/conjugated diene block copolymers represented by the formulae such as for example $(A\text{-}B\text{-})_{\overline{n}}A$, $(B\text{-}A\text{-}B\text{-})_{\overline{n}}A$, $(B\text{-}A\text{-}B\text{-})_{\overline{n}}A\text{-}B$, $(A\text{-}B\text{-})_{\overline{m}}X$, $(B\text{-}A\text{-}B\text{-})_{\overline{m}}X$, etc., wherein n is an integer of 1 or more, m is an integer of 2 or more and X represents a coupling or polyfunctional initiator residue having two or more functional groups.

This hydrogenated block copolymer contains 5 to 60 wt. %, preferably 10 to 50 wt. % of a vinyl-substituted aromatic hydrocarbon. Referring now to its block structure, the polymer block A composed mainly of a vinyl-substituted aromatic hydrocarbon has the structure of the homopolymer block of a vinyl-substituted aromatic hydrocarbon or the copolymer block of a vinyl-substituted aromatic hydrocarbon containing more than 50 wt. %, preferably not less than 70 wt. % of vinyl-substituted aromatic hydrocarbon with a hydrogenated conjugated diene and the polymer block B composed mainly of a hydrogenated conjugated diene has the structure of the homopolymer block of a hydrogenated conjugated diene or the copolymer block of a hydrogenated conjugated diene containing more than 50 wt. %, preferably not less than 70 wt. % of hydrogenated conjugated diene with a vinyl-substituted aromatic hydrocarbon. Also, as to the distribution of the hydrogenated conjugated diene or the vinyl-substituted aromatic hydrocarbon contained in the molecular chains of the polymer block A composed mainly of a vinyl-substituted aromatic hydrocarbon and the polymer block B composed mainly of a hydrogenated conjugated diene, the both polymer blocks may take any of random, tapered (the monomer components increase or decrease along the molecular chain) and partial block arrangements and combinations thereof; and when the numbers of both said polymer blocks A and B are 2 or more, the structures of the respective polymer blocks may be the same or different.

The vinyl-substituted aromatic hydrocarbon constituting the hydrogenated block copolymer is one or more members selected from the group consisting of styrene, α-methylstyrene, vinyltoluene, p-tert-butylstyrene, etc. Of these compounds, styrene is preferred. A conjugated diene before hydrogenation constituting the hydrogenated conjugated diene is one or more members selected from the group consisting of butadiene, isoprene, 1,3-pentadiene, 2,3-dimethyl-1,3-butadiene, etc. Of these, butadiene, isoprene and combination of the both are preferred. The polymer block composed mainly of a conjugated diene before hydrogenation may contain any amount, expressed by mole %, of the conjugated diene micro structure, and for example a polybutadiene block contains 20 to 50 mole %, preferably 25 to 45 mole % of the 1,2-vinyl bond.

The hydrogenated block copolymer of the above structure used in the present invention has a number average molecular weight in a range of from 5,000 to 1,000,000, preferably from 50,000 to 800,000, more preferably 70,000 to 500,000, and the molecular weight distribution [ratio ($\overline{M}w/\overline{M}n$) of weight average molecular weight ($\overline{M}w$) to number average molecular weight ($\overline{M}n$)] is 10 or less. The molecular structure type of the hydrogenated block copolymer may be any of straight-chain, branched involving partial coupling with a coupling agent, radial and the star-shaped types and combinations thereof.

There is no limitation to a method for producing these hydrogenated block copolymers, so far as they have the structure described above. Said copolymers can be obtained by synthesizing a vinyl-substituted aromatic hydrocarbon/conjugated diene block copolymer in an inert solvent using an organo-lithium and if necessary, a 1,2-vinyl bond modifier such as ether compounds, tertiary amines, etc. according to the methods, for example, disclosed in B.P. No. 1,130,770 and U.S. Pat. Nos. 3,281,383 and 3,639,517, and then hydrogenating the resulting block copolymer according to the well-known methods, for example, disclosed in B.P. No. 1,020,720 and U.S. Pat. Nos. 3,333,024 and 4,501,857. In this case, the polymer block composed mainly of the conjugated diene can be changed in form to the polymer block of an olefinic compound by hydrogenating at least 80 mole % of the aliphatic double bond coming from the conjugated diene of the vinyl-substituted aromatic hydrocarbon/conjugated diene block copolymer. Also, there is no particular limitation to the hydrogenation ratio of the aromatic double bond coming from the polymer block A composed mainly of the vinyl-substituted aromatic hydrocarbon and the vinyl-substituted aromatic hydrocarbon which has been incorporated as a co-monomer, as need arises, in the polymer block B composed mainly of the conjugated diene, but the hydrogenation ratio is preferably 20 mole % or less. The amount of unhydrogenated aliphatic double bond contained in the hydrogenated block copolymer can easily be known by infrared spectrophotometer, nuclear magnetic resonance apparatus, etc.

In the present invention, the polyphenylene ether resin used as the component (b) is essential to improve the high-temperature (100° C.) compression set as well as the balance between oil resistance and compression set of the composition obtained. This resin is a homopolymer and/or copolymer comprising a binding unit represented by the general formula,

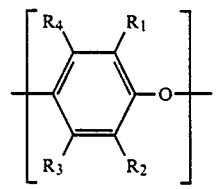

wherein $R_1$, $R_2$, $R_3$ and $R_4$, which may be the same or different, represent substituents selected from the group consisting of hydrogen, halogen, hydrocarbon groups and substituted hydrocarbon groups, and having a reduced viscosity in a range of from 0.15 to 0.70, preferably 0.30 to 0.70 as measured at 30° C. in a 0.5 g/dl chloroform solution. The well-known polyphenylene ether resins may be used, and examples of such resins include for example poly(2,6-dimethyl-1,4-phenylene ether), poly(2-methyl-6-ethyl-1,4-phenylene ether), poly(2,6-diphenyl-1,4-phenylene ether), poly(2-methyl-6-phenyl-1,4-phenylene ether), poly(2,6-dichloro-1,4-phenylene ether), etc. Further, copolymers of 2,6-dimethylphenol with other phenols (e.g. 2,3,6-trimethylphenol, 2-methyl-6-butylphenol) may also be used. Of these polymers and copolymers, poly(2,6-dimethyl-1,4-phenylene ether) and a copolymer of 2,6-dimethylphenol with 2,3,6-trimethylphenol are preferably used.

The amount of the polyphenylene ether, component (b), blended is preferably selected from a range of from 11 to 233 parts by weight based on 100 parts by weight of the hydrogenated block copolymer, component (a). When the amount exceeds 233 parts by weight, the hardness of hydrogenated block copolymer compositions obtained is too high, so that the compositions lose flexibility to become resinous, and as a result, no products of rubber like can not only be obtained, but the compression set at high temperatures (100° C.×22 hours) is unpreferably increased. While when the amount is less than 11 parts by weight, no improvement in high-temperature compression set due to the addition of the polyphenylene ether resin can unpreferably be observed.

In the present invention, the non-aromatic softening agent for rubber used as the component (c) is essential to obtain soft and rubber-like compositions, and as such agent, non-aromatic mineral oils or liquid or low molecular weight synthetic softening agents are suitable. Generally, mineral oil type softening agents for rubber, generally called "process oil" or "extender oil", commonly used for the softening, increase in volume and improvement in processability of rubber are a mixture of three kinds of compound having an aromatic ring, a naphthene ring and a paraffin chain, respectively. And, those in which the number of carbons of the paraffin chain occupies 50% or more of the total carbon number are called a paraffin type oil, those in which the number of carbons of the naphthene ring occupies 30 to 45% of the total carbon number are called a naphthene type oil, and those in which the number of carbons of the aromatic ring occupies more than 30% of the total carbon number are called aromatic type oil.

Of the above mineral oil type softening agents for rubber used as the component (c), the paraffin type oil is preferred, and particularly, those in which the content of aromatic components is substantially 0.3% or less as analyzed by ASTM 2140-63T are preferred. The paraffin having a large content of aromatic components, naphthene and aromatic type oils are not preferred because they increase the high-temperature (100° C.) compression set of the composition obtained.

The properties of the non-aromatic softening agents for rubber used in the present invention should be as follows: Dynamic viscosity at 37.8° C., 20 to 500 cst; flow temperature, −10° to −15° C.; and flashing point, 170° to 300° C. The synthetic softening agents which can be used include low molecular weight polybutene, low molecular weight polybutadiene, etc., but the above mineral oil type softening agents give better results.

The amount of the softening agent, component (c), blended is 10 to 500 parts by weight, preferably 100 to 400 parts by weight based on 100 parts by weight of the component (a).

If the amount of the component (c) is less than 10 parts by weight, the resulting product becomes resinlike, increases its hardness and loses its flexibility. Additionally, the product itself can be considered not to be economical due to a small quantity in the use of cheap softening agent. If the component (c) is blended in a range of 10 to 300 parts by weight, a composition superior in the high-temperature (100° C.) compression set can be obtained. Furthermore, particularly, in order to satisfy the requirements both in the oil resistance and the high-temperature (100° C.) compression set, it is necessary to increase the amount of the component (d) with keeping the amount of the component C at the range of 50 parts by weight or more. If the amount exceeds 500 parts by weight, the product results in bleeding the component (c), generation of tackiness and the like.

In the present invention, the polyolefin resin used as the component (d) is useful to improve the processability and oil resistance of the composition obtained. Any of the well-known polyolefin resins may be used, and such resins include for example polyethylene, isotactic polypropylene, copolymers of propylene with a small amount of other α-olefins (e.g. propylene/ethylene random copolymers, propylene/ethylene block copolymers, propylene/1-hexene copolymers, propylene/4-methyl-1-pentene copolymers), poly(4-methyl-1-pentene), polybutene-1, etc. Of these resins, isotactic polypropylene, high-density polyethylene and super-high-molecular-weight high-density polyethylene (viscosity average molecular weight measured at 130° C. in a tetralin solution, more than 1,000,000) are preferably used.

The polystyrene resin used as the component (d) is useful to improve the processability of the composition obtained, and those obtained by the well-known radical polymerization or ionic polymerization are preferably used. Such resins include for example polystyrene, poly(α-methylstyrene) and poly(p-methylstyrene), among which resins having a number average molecular weight of from 5,000 to 500,000, preferably from 10,000 to 200,000 are preferably used.

The amount of the component (d) blended is 5 to 150 parts by weight, preferably 10 to 150 parts by weight based on 100 parts by weight of the component (a). A product having superiorities in oil resistance, and high-temperature (100° C.) compression set can be obtained by adding the component (d) in a range of over 150 to 250 parts by weight, however, the amount up to 150 parts by weight is preferable in view of the balance between oil resistance and high-temperature (100° C.) compression set, and properties requisite as rubber. Furthermore, the hardness of the resulting products becomes too high to maintain flexibility, and the high-temperature (100° C.) compression set is unpreferably increased to an extreme degree.

On the other hand, when the amount is less than 5 parts by weight, any improvement in the important processability can not be expected. If the amount in a range from 5 to 30 parts by weight is added, a composition having an excellent high-temperature (100° C.) compression set, but similar oil resistance. Moreover, the amount in a range of over 30 to 150 parts by weight is added, a composition superior in the oil resistance, the high-temperature (100° C.) compression set and properties requisite as rubber can be obtained.

In addition to the foregoing components (a) to (d), the composition of the present invention may contain inorganic fillers, flame retardants, glass fibers, carbon fibers, antioxidants, ultraviolet absorbers, hindered amine type light stabilizers and coloring agents. The inorganic fillers which can be used include for example calcium carbonate, carbon black, talc, clay, magnesium hydroxide, mica, barium sulfate, natural silicon dioxide, synthetic silicon dioxide (white carbon), titanium dioxide, etc. Electroconductive fillers may also be added to give the composition electroconductivity.

For compounding the hydrogenated block copolymer of the present invention, techniques used for producing the common resin compositions and rubber compositions, for example compounding techniques using melt-kneaders such as single-screw extruders, twin-screw extruders, Banbury mixers, heating rolls, Brabender plastographs, various kneaders, etc. may be used. In this case, there is no limitation to the order of addition of these components, and for example, the following techniques may be employed: All the components are first pre-mixed by means of mixers such as Henschel mixer, blender, etc. and then melt-compounded on the above kneaders; and some of the components are pre-mixed and melt-compounded into a master batch, and then the rest of the components is added thereto and melt-compounded.

The composition of the present invention thus compounded can be molded on the commonly used molding machines for thermoplastic resins, and various molding techniques such as compression molding, injection molding, extrusion molding, blow molding, calendering, etc. may be applied to the composition of the present invention.

The composition obtained according to the present invention is superior in flexibility, mechanical strength, high-temperature (100° C.) compression set, moldability and oil resistance, so that it can preferably be used in the fields of automobile parts, electric appliance parts, electronic appliance parts, various electric wire-protecting materials, medical appliance parts, etc.

The present invention will be illustrated in more detail with reference to the following examples, but it is not limited to these examples.

The physical properties used for evaluation in the examples and comparative examples were measured as follows:

(1) Hardness [-]:
   According to JIS K 6301, A type.
(2) Tensile strength [kg/cm$^2$] and elongation [%]:
   According to JIS K 6301; test piece, form No. 3 cut from injection-molded sheet of 2 mm in thickness.
(3) Compression set [%]:
   According to JIS K 6301; residual strain rate after 25% deformation of the thickness by 22 hours' compression at 100° C.
(4) Oil resistance:
   A test piece of 20 mm×50 mm×2 mm (thick) is dipped at 70° C. for 2 hours in the test oil No. 3 (lubricant) specified by JIS K 6301, and a change in weight (%) of the test piece before and after dipping is calculated.

Components used for blending are as follows:
(1) Component (a-1):
   A hydrogenated block copolymer of a constitution as described below was synthesized using the titanium catalyst described in U.S. Pat. No. 4,501,857 and designated as "component (a-1)":
   Structure: polystyrene/hydrogenated polybutadiene/polystyrene
   Amount of bonded styrene: 27 wt. %
   Number average molecular weight: 157,000
   Molecular weight distribution: 1.07
   Amount of the 1,2-vinyl bond of polybutadiene before hydrogenation: 34 mole %
   Ratio of hydrogenation: 98%
Component (a-2):
   A hydrogenated block copolymer of a constitution as described below was synthesized using the titanium catalyst described in U.S. Pat. No. 4,501,857 and designated as "component (a-2)":
   Structure: (polystyrene/hydrogenated polybutadiene)$_4$Si
   Amount of bonded styrene: 36 wt. %
   Number average molecular weight: 379,000
   Molecular weight distribution: 1.35
   Amount of the 1,2-vinyl bond of polybutadiene before hydrogenation: 27 mole %
   Ratio of hydrogenation: 99%
Component (a-3):
   A hydrogenated block copolymer of a constitution as described below was synthesized using the titanium catalyst described in U.S. Pat. No. 4,501,857 and designated as "component (a-3)":
   Structure: hydrogenated polybutadiene/polystyrene/hydrogenated polybutadiene/polystyrene
   Amount of bonded styrene: 36 wt. %
   Number average molecular weight: 128,000
   Molecular weight distribution: 1.04
   Amount of the 1,2-vinyl bond of polybutadiene before hydrogenation: 32 mole %
   Ratio of hydrogenation: 99%
Component (a-4):
   Krato® G1651 (a product of Shell Chemical Co., U.S.A.) which is a hydrogenated block copolymer of a constitution as described below was designated as "component (a-4)":
   Structure: polystyrene/hydrogenated polybutadiene/polystyrene
   Amount of bonded styrene: 33 wt. %
Component (a-5):
   A hydrogenated block copolymer of a constitution as described below was synthesized by the method described in U.S. Pat. No. 3,333,024 and designated as "component (a-5)":
   Structure: hydrogenated polybutadiene/polystyrene/hydrogenated polybutadiene/polystyrene
   Amount of bonded styrene: 22 wt. %
   Number average molecular weight: 83,000
   Molecular weight distribution: 1.03
   Amount of the 1,2-vinyl bond of polybutadiene before hydrogenation: 39 mole %
   Ratio of hydrogenation: 98%
Component (a-6):
   A hydrogenated block copolymer of a constitution as described below was synthesized by the method described in U.S. Pat. No. 3,333,024 and designated as "component (a-6)":
   Structure: (polystyrene/hydrogenated polybutadiene)$_4$Si
   Amount of bonded styrene: 30 wt. %
   Number average molecular weight: 326,000
   Molecular weight distribution: 1.58
   Amount of the 1,2-vinyl bond of polybutadiene before hydrogenation: 40 mole %
   Ratio of hydrogenation: 98%
Component (a-7):
   A hydrogenated block copolymer of a constitution as described below was synthesized using the titanium catalyst described in U.S. Pat. No. 4,501,857 and designated as "component (a-7)":
Structure: hydrogenated polybutadiene/polystyrene/hydrogenated polybutadiene/polystyrene
Amount of bonded styrene: 31 wt. %
Number average molecular weight: 154,000
Molecular weight distribution: 1.06
Amount of the 1,2-vinyl bond of polybutadiene before hydrogenation: 28 mole %
Ration of hydrogenation: 99%

Component (a-8):
A hydrogenated block copolymer of a constitution as described below was synthesized using the titanium catalyst described in U.S. Pat. No. 4,501,857 and designated as "component (a-8)":
Structure: polystyrene/hydrogenated polybutadiene/polystyrene
Amount of bonded styrene: 33 wt. %
Number average molecular weight: 194,000
Molecular weight distribution: 1.05
Amount of the 1,2-vinyl bond of polybutadiene before hydrogenation: 37 mole %
Ratio of hydrogenation: 99%

Component (a-9):
A styrene/butadiene block copolymer of a constitution as described below was synthesized:
Structure: polystyrene/poly(styrene/butadiene=10/90 by wt. %)/poly(styrene/butadiene=10/90 by wt. %)/poly((styrene/butadiene=10/90 by wt. %)/polystyrene
Amount of total bonded styrene: 37 wt. %
Amount of blocked styrene: 30 wt. %
Number average molecular weight: 171,000
Molecular weight distribution: 1.07
Amount of 1,2-vinyl bond: 38 mole % and then hydrogenated using the titanium hydrogenation catalyst described in U.S. Pat. No. 4,501,857 to obtain a hydrogenated block copolymer (a-9) having a hydrogenation ratio of 99%.

Component (a-10):
A hydrogenated block copolymer of a constitution as described below was synthesized using the titanium catalyst described in U.S. Pat. No. 4,501,857 and designated as "component (a-10)":
Structure: (polystyrene/hydrogenated polybutadiene)$_4$Si
Amount of bonded styrene; 26 wt. %
Number average molecular weight: 384,000
Molecular weight distribution: 1.46
Amount of the 1,2-vinyl bond of polybutadiene hydrogenation: 41 mole %
Ratio of hydrogenation: 99%

(2) Component (b-1):
Poly(2,6-dimethyl-1,4-phenylene) ethers having a reduced viscosity of 0.31, 0.37, 0.57, 0.66 and 0.68, respectively were synthesized for a polyphenylene ether resin, and designated as "component (b-1)".

Component (b-2):
2,6-dimethylphenol/2,3,6-trimethylphenol copolymer containing 5 mole % of 2,3,6-trimethylphenol and having a reduced viscosity of 0.51, 0.53 and 0.54, respectively were synthesized for a polyphenylene ether resin, and designated as "component (b-2)".

(3) Component (c-1):
A paraffin type process oil, PW-380 (a product of Idemitsu Kosan Co., Japan), of a constitution as described below was designated as "component (c-1)":

Dynamic viscosity: 381.6 cst (40° C.), 30.1 cst (100° C.)
Average molecular weight: 746
Content of aromatic component: 0%
Content of naphthene component: 27%
Content of paraffin component: 73%

Component (c-2):
A paraffin type process oil. PS-32 (a product of Idemitsu Kosan Co., Japan), of a constitution as described below was designated as "component (c-2)":
Dynamic viscosity: 31.42 cst (40° C.), 5.42 cst (100° C.)
Average molecular weight: 408
Content of aromatic component: 0.1%
Content of naphthene component: 32.8%
Content of paraffin component: 67.1%

(4) Component (d-1):
Polypropylene, M-1300 (a product of Asahi Chemical Ind. Co., Ltd., Japan), was designated as "component (d-1)".

Component (d-2):
Polypropylene, E-1100 (a product of Asahi Chemical Ind. Co., Ltd., Japan), was designated as "component (d-2)".

Component (d-3):
High-density polyethylene, SUNTEC® J240 (a product of Asahi Chemical Ind. Co., Ltd., Japan), was designated as "component (d-3)".

Component (d-4):
Super-high-molecular-weight high-density polyethylene, SUNFINE® UH900 (a product of Asahi Chemical Ind. Co., Ltd., Japan) [viscosity average molecular weight, 3,300,000], was designated as "component (d-4)".

Component (d-5):
Polystyrene, STYRON® 685 (a product of Asahi Chemical Ind. Co., Ltd., Japan), was designated as "component (d-5)".

Component (d-6):
A polystyrene resin having a number average molecular weight of 34,000 and a molecular weight distribution of 1.03 was synthesized by polymerizing styrene using a lithium catalyst, and designated as "component (d-6)".

In addition to the above components, calcium carbonate was also used as an inorganic filler.

EXAMPLES 1 TO 4 AND COMPARATIVE EXAMPLES 1 AND 2

The hydrogenated block copolymers (a-1) and (a-2), the polyphenylene ether resin (b-1) having a reduced viscosity of 0.57 and other components shown in Table 1 were mixed in proportions shown in Table 1 by means of a Henschel mixer and melt-kneaded at 250° C. on a twin-screw extruder of 50 mm in diameter (TEM-50; a product of Toshiba Machine Co., Ltd., Japan) to obtain hydrogenated block copolymer compositions. Test pieces were prepared by injection-molding these compositions and measured for the physical properties. The results are shown in Table 1.

It is apparent from these results that the compositions based on the present hydrogenated block copolymers have a compression set of 50% or less at 100° C., showing that their rubber-like elasticity at high temeratures is excellent, while that the compositions outside the scope of the present invention have a large compression set at 100° C., showing that their rubber-like elasticity at high temperatures is poor.

rior in rubber-like elasticity at high temperatures, while that the compositions outside the scope of the present invention have a large compression set at 100° C., showing that they are poor in the rubber-like elasticity at high temperatures.

TABLE 1

|  |  | Example 1 | Example 2 | Example 3 | Example 4 | Comparative example 1 | Comparative example 2 |
|---|---|---|---|---|---|---|---|
| Composition (wt. %) | Component (a) | (a-1) 30 | (a-2) 36 | (a-2) 21 | (a-1) 14 | (a-1) 21 | (a-2) 30 |
|  | Component (b-1) PPE (0.57) | 10 | 36 | 21 | 31 | 0 | 2 |
|  | Component (c-1) PW-380 | 50 | 23 | 28 | 28 | 31 | 20 |
|  | Component (d-1) M-1300 | 10 | 5 | 9 | 6 | 9 | 10 |
|  | Calcium carbonate | 0 | 0 | 21 | 21 | 39 | 38 |
| Physical property | Hardness (JIS-A) [—] | 57 | 76 | 70 | 73 | 63 | 75 |
|  | Tensile strength [kg/cm$^2$] | 112 | 190 | 110 | 80 | 76 | 120 |
|  | Elongation [%] | 810 | 500 | 450 | 390 | 840 | 800 |
|  | Compression set [%] (100° C. × 22 hours) | 43 | 34 | 36 | 31 | 82 | 78 |

EXAMPLE 5

Procedure was carried out in the same manner as in

TABLE 2

|  |  | Example 6 | Example 7 | Example 8 | Example 9 | Comparative example 3 | Comparative example 4 | Comparative example 5 |
|---|---|---|---|---|---|---|---|---|
| Composition (wt. %) | Component (a) | (a-3) 21 | (a-4) 21 | (a-6) 34 | (a-3) 18 | (a-3) 21 | (a-3) 20 | (a-4) 30 |
|  | Component (b-1) PPE (0.37) | 18 | 8 | 15 | 40 | 0 | 8 | 2 |
|  | Component (c-1) PW 380 | 42 | 35 | 38 | 25 | 31 | 25 | 20 |
|  | Component (d-1) M-1300 | 9 | 9 | 0 | 2 | 0 | 17 | 5 |
|  | (d-5) STYRON ®685 | 3 | 2 | 13 | 15 | 9 | 30 | 5 |
|  | Calcium carbonate | 7 | 25 | 0 | 0 | 39 | 0 | 38 |
| Physical property | Hardness (JIS-A) [—] | 54 | 63 | 65 | 76 | 64 | 99 | 77 |
|  | Tensile strength [kg/cm$^2$] | 90 | 80 | 140 | 95 | 72 | 196 | 105 |
|  | Elongation [%] | 680 | 540 | 750 | 430 | 870 | 610 | 810 |
|  | Compression set [%] (100° C. × 22 hours) | 33 | 42 | 43 | 40 | 79 | 86 | 77 |

Example 2 except that the hydrogenated block copolymer (a-1) and the polyphenylene ether resin (b-2) having a reduced viscosity of 0.51 were used, to prepared test pieces, which were then measured for the physical properties. As a result, a hydrogenated block copolymer composition having the following properties was obtained: Hardness, 75; tensile strength, 180 kg/cm$^2$; elongation, 390%; and compression set at 100° C., 38%.

EXAMPLES 6 TO 9 AND COMPARATIVE EXAMPLES 3 TO 5

The hydrogenated block copolymers (a-3), (a-4) and (a-6), the polyphenylene ether resin (b-1) having a reduced viscosity of 0.37 and other components shown in Table 2 were mixed in proportions shown in Table 2 by means of a Henschel mixer and melt-kneaded at 260° C. on a twin-screw extruder of 30 mm in diameter to obtain hydrogenated block copolymer compositions. These compositions were injection-molded and measured for the physical properties. The results are shown in Table 2.

It is apparent from these results that the compositions obtained according to the present invention have a small compression set at 100° C. even though a polystyrene resin is used together, showing that they are supe-

EXAMPLES 10 AND 11

The hydrogenated block copolymer (a-5), the polyphenylene ether resin (b-2) having a reduced viscosity of 0.53 and other components shown in Table 3 were mixed and melt-kneaded in the same manner as in Examples 6 to 9, to obtain hydrogenated block copolymer compositions. These compositions were injection-molded to prepare test pieces, which were then measured for the physical properties. The results are shown in Table 3.

It is apparent from these results that the compositions obtained according to the present invention have a small compression set at 100° C. even though the copolymeric polyphenylene ether resin is used together, showing that they are superior in the rubber-like elasticity at high temperatures.

TABLE 3

|  |  | Example 10 | Example 11 |
|---|---|---|---|
| Composition (wt. %) | Component (a) | (a-5) 35 | (a-5) 40 |

TABLE 3-continued

|  | Example 10 | Example 11 |
|---|---|---|
| Component (b-2) compolymeric PPE (0.53) | 30 | 25 |
| Component (c-1) | 26 | 30 |
| Component (d) PW 380 (d-1) | 6 | 0 |
| M-1300 (d-5) | 3 | 5 |
| STYRON ® 685 | | |
| Calcium carbonate | 0 | 0 |
| Physical property Hardness (JIS-A) [—] | 64 | 57 |
| Tensile strength [kg/cm²] | 92 | 98 |
| Elongation [%] | 390 | 420 |
| Compression set [%] (100° C. × 22 hours) | 59 | 55 |

EXAMPLE 12

Procedure was carried out in the same manner as in Example 6 except that the polyphenylene ether resin (b-1) having a reduced viscosity of 0.68 was used, to obtain a hydrogenated block copolymer composition. This composition was injection-molded to prepare test pieces, which were then measured for the physical properties to obtain the following result: Hardness, 55; tensile strength, 100 kg/cm²; elongation, 710%; and compression set at 100° C., 35%.

EXAMPLES 13 TO 16 AND COMPARATIVE EXAMPLES 6 TO 8

The hydrogenated block copolymers (a-7), (a-8), (a-9) and (a-10), the polyphenylene ether resin (b-1) having a reduced viscosity of 0.66 and other components shown in Table 4 were mixed in proportions shown in Table 4 by means of a Henschel mixer and melt-kneaded at 240° C. on a twin-screw extruder of 50 mm in diameter to obtain hydrogenated block copolymer compositions.

These compositions were injection-molded to prepare test pieces, which were then measured for the physical properties. The results are shown in Table 4.

It is apparent from these results that the compositions obtained according to the present invention are superior in the oil resistance and compression set at 100° C. Also, an adhesion property was not observed at all at the surface of the test piece after the oil resistance test.

TABLE 4

|  |  | Example | | | | Comparative example | | |
|---|---|---|---|---|---|---|---|---|
|  |  | 13 | 14 | 15 | 16 | 6 | 7 | 8 |
| Composition (wt. %) | Component (a) | (a-7) 20 | (a-8) 15 | (a-9) 25 | (a-10) 16 | (a-7) 21 | (a-8) 30 | (a-8) 40 |
|  | Component (b-1) PPE (0.66) | 12 | 5 | 9 | 14 | 0 | 2 | 0 |
|  | Component (c-2) PS-32 | 45 | 48 | 30 | 40 | 31 | 30 | 45 |
|  | Component (d-2) E-1100 | 20 | 18 | 13 | 24 | 9 | 30 | 15 |
|  | Calcium carbonate | 3 | 14 | 23 | 6 | 39 | 8 | 0 |
| Physical property | Hardness (JIS-A) [—] | 83 | 70 | 78 | 90 | 62 | 90 | 68 |
|  | Tensile strength [kg/cm²] | 135 | 70 | 145 | 92 | 69 | 121 | 140 |
|  | Elongation [%] | 560 | 500 | 640 | 400 | 880 | 660 | 890 |
|  | Oil resistance [Δ wt. %] | 13 | 15 | 12 | 7 | 29 | 23 | 48 |
|  | Compression set [%] (100° C. × 22 hours) | 45 | 41 | 44 | 49 | 81 | 94 | 92 |

EXAMPLE 17

Procedure was carried out in the same manner as in Example 13 except that the polyphenylene ether resin (b-2) having a reduced viscosity of 0.54 was used, to obtain a hydrogenated block copolymer composition. This composition was injection-molded to prepare test pieces, which were then measured for the physical properties to obtain the following result: Hardness, 84; tensile strength, 105 kg/cm²; elongation, 500%; oil resistance, 13 wt. %; and compression set at 100° C., 49%. It is apparent from this result that this hydrogenated block copolymer composition is superior in the oil resistance and rubber-like elasticity at high temperatures.

EXAMPLES 18 TO 22 AND COMPARATIVE EXAMPLES 9 TO 11

The hydrogenated block copolymers (a-7), (a-8) and (a-9), the polyphenylene ether resins (b-1) having a reduced viscosity of 0.31 and 0.66, respectively, the polystyrene resin (d-6) and other components shown in Table 5 were mixed in proportions shown in Table 5 and melt-kneaded in the same manner as in Examples 13 to 16, to obtain hydrogenated block copolymer compositions. These compositions were injection-molded to prepare test pieces, which were then measured for the physical properties. The results are shown in Table 5.

It is apparent from these results that the compositions within the scope of the present invention are superior in the balance between oil resistance and compression set at 100° C.

TABLE 5

|  |  | Example | | | | | Comparative example | | |
|---|---|---|---|---|---|---|---|---|---|
|  |  | 18 | 19 | 20 | 21 | 22 | 9 | 10 | 11 |
| Composition (wt. %) | Component (a) | (a-7) 15 | (a-8) 9 | (a-9) 14 | (a-7) 13 | (a-7) 42 | (a-7) 15 | (a-8) 9 | (a-9) 14 |
|  | Component (b-1) PPE (0.31) | 13 | 13 | 6 | 0 | 0 | 9 | 5 | 6 |

TABLE 5-continued

|  |  |  | Example |  |  |  |  | Comparative example |  |  |
|---|---|---|---|---|---|---|---|---|---|---|
|  |  |  | 18 | 19 | 20 | 21 | 22 | 9 | 10 | 11 |
|  | (b) | (b-1) PPE (0.66) | 0 | 0 | 0 | 2 | 24 | 0 | 0 | 0 |
|  |  | Component (c-2) PS-32 | 30 | 42 | 43 | 60 | 21 | 30 | 42 | 43 |
|  | Component (d) | (d-2) E-1100 | 9 | 6 | 10 | 9 | 13 | 10 | 10 | 15 |
|  |  | (d-6) Polystyrene | 10 | 4 | 4 | 0 | 0 | 20 | 15 | 15 |
|  |  | Calcium carbonate | 23 | 26 | 23 | 16 | 0 | 16 | 19 | 7 |
| Physical property | Hardness (JIS-A) [—] |  | 80 | 65 | 60 | 34 | 90 | 83 | 69 | 77 |
|  | Tensile strength [kg/cm²] |  | 142 | 72 | 105 | 59 | 192 | 137 | 65 | 89 |
|  | Elongation [%] |  | 610 | 480 | 650 | 980 | 560 | 630 | 410 | 600 |
|  | Oil resistance [Δ wt. %] |  | 11 | 15 | 20 | 23 | 11 | 21 | 19 | 20 |
|  | Compression set [%] (100° C. × 22 hours) |  | 39 | 43 | 41 | 34 | 46 | 76 | 89 | 91 |

EXAMPLES 23 TO 26

The hydrogenated block copolymer (a-7), high-density polyethylene (d-3) which is a polyolefin resin, and other components shown in Table 6 were mixed by means of a Henschel mixer and then melt-kneaded at 250° C. on a twin-screw extruder of 50 mm in a diameter, to obtain hydrogenated block copolymer compositions. These compositions were injection-molded to prepare test pieces, which were then measured for the physical properties. The results are shown in Table 6.

It is apparent from these results that the compositions of hydrogenated block copolymer with high-density polyethylene, when combined with the polyphenylene ether resin and the oil, give rubber-like compositions superior in the oil resistance and compression set at 100° C.

TABLE 6

|  |  | Example |  |  |  |
|---|---|---|---|---|---|
|  |  | 23 | 24 | 25 | 26 |
| Composition (wt. %) | Component (a-7) | 25 | 23 | 23 | 21 |
|  | Component (b-1) PPE (0.66) | 14 | 12 | 13 | 12 |
|  | Component (c-2) PS-32 | 41 | 37 | 37 | 34 |
|  | Component (d-3) HDPE (J-240) | 20 | 28 | 18 | 25 |
|  | Calcium carbonate | 0 | 0 | 9 | 8 |
| Physical property | Hardness (JIS-A) [—] | 70 | 80 | 78 | 86 |
|  | Tensile strength [Kg/cm²] | 135 | 140 | 86 | 94 |
|  | Elongation [%] | 780 | 790 | 540 | 580 |
|  | Oil resistance [Δ wt. %] | 14 | 8 | 10 | 6 |
|  | Comporession set [%] (100° C. × 22 hours) | 48 | 50 | 52 | 53 |

EXAMPLES 27 TO 31

The hydrogenated block copolymer (a-7), super-high-molecular-weight high-density polyethylene (d-4) which is a polyolefin resin, and other components shown in Table 7 were mixed by means of a Henschel mixer and then melt-kneaded at 250° C. on a twin-screw extruder of 50 mm in diameter, to obtain hydrogenated block copolymer compositions. The compositions were injection-molded to prepare test pieces, which were then measured for the physical properties. The results are shown in Table 7.

It is apparent from these results that the compositions of hydrogenated block copolymer with super-high-molecular-weight high-density polyethylene, when combined with the polyphenylene ether resin and the oil, give rubber-like compositions superior in the oil resistance and compression set at 100° C.

TABLE 7

|  |  | Example |  |  |  |  |
|---|---|---|---|---|---|---|
|  |  | 27 | 28 | 29 | 30 | 31 |
| Composition (wt. %) | Component (a-7) | 25 | 26 | 26 | 25 | 25 |
|  | Component (b-1) PPE (0.66) | 10 | 17 | 11 | 13 | 8 |
|  | Component (c-2) PS-32 | 55 | 40 | 40 | 49 | 55 |
|  | Component (d-4) UH900 | 10 | 17 | 23 | 13 | 12 |
| Physical property | Hardness (JIS-A) [—] | 54 | 78 | 81 | 67 | 60 |
|  | Tensile strength [kg/cm²] | 93 | 141 | 149 | 130 | 123 |
|  | Elongation [%] | 630 | 480 | 520 | 670 | 730 |
|  | Oil resistance [Δ wt. %] | 17 | 10 | 6 | 13 | 15 |
|  | Compression set [%] (100° C. × 22 hours) | 43 | 46 | 45 | 44 | 42 |

What is claimed is:

1. A composition having a compression set (JIS K 6301; 100° C.×22 hours; and compressibility, 25%) of 65% or less as rubber, consisting essentially of:
   (a) 100 parts by weight of a hydrogenated block copolymer obtained by hydrogenating a block copolymer comprising at least two polymer blocks A composed mainly of a vinyl-substituted aromatic hydrocarbon and at least one polymer block B composed mainly of a conjugated diene,
   (b) 11 to 233 parts by weight of a polymer selected from the group consisting of a homopolymeric polyphenylene ether resin, a copolymeric polyphenylene ether resin and combinations thereof, comprising a binding unit represented by the general formula,

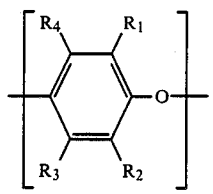

wherein $R_1$, $R_2$, $R_3$ and $R_4$, which may be the same or different, represent substituents selected from the group consisting of hydrogen, halogen, hydrocarbon groups and substituted hydrocarbon groups, and having a reduced viscosity in a range of from 0.15 to 0.70 as measured at 30° C. in a 0.5 g/dl chloroform solution, (c) 10 to 500 parts by weight of a non-aromatic softening agent for rubber, and (d) 5 to 150 parts by weight of a resin selected from the group consisting of a polyolefin resin, a polystyrene resin and a combination thereof.

2. The composition according to claim 1, wherein the hydrogenated block copolymer (a) is one produced by hydrogenating a block copolymer which comprises two or more polymer blocks A composed mainly of a vinyl-substituted aromatic hydrocarbon and two or more polymer blocks B composed mainly of a conjugated diene and in which at least one polymer block B is arranged at the end of the polymer chains and the content of the vinyl-substituted aromatic hydrocarbon bonded is 10 to 50 wt. %, thereby reducing the content of the unsaturated bond of the polymer block B after hydrogenation to 20 mole % or less of that of the polymer block B before hydrogenation.

3. The composition according to claim 2, wherein the hydrogenated block copolymer (a) is a hydrogenated product of a block copolymer having a B-A-B-A structure.

4. The composition according to claim 1, wherein the hydrogenated block copolymer (a) is one produced by hydrogenating a block copolymer which comprises at least two terminal blocks A composed mainly of a vinyl-substituted aromatic hydrocarbon and at least one mid-block B composed mainly of a conjugated diene and in which the content of the vinyl-substituted aromatic hydrocarbon bonded is 10 to 50 wt. %, thereby reducing the content of the unsaturated bond of the polymer block B after hydrogenation to 20 mole % or less of that of the polymer block B before hydrogenation.

5. The composition according to claim 4, wherein the hydrogenated block copolymer (a) is a hydrogenated product of a block copolymer having an A-B-A structure.

6. The composition according to claim 1, wherein the hydrogenated block copolymer (a) is one produced by hydrogenating a block copolymer which has a structure of $(A-B)_{\overline{m}}X$, $(B-A-B)_{\overline{m}}X$ or mixture thereof wherein X represents a coupling agent having two or more functional groups or a polyfunctional initiator residue and m represents an integer of 2 or more, and in which the content of the vinyl-substituted aromatic hydrocarbon bonded is 10 to 50 wt. %, thereby reducing the content of the unsaturated bond of the polymer block B after hydrogenation to 20 mole % of less of the polymer block B before hydrogenation.

7. The composition according to claim 1, wherein the hydrogenated block copolymer (a) is a hydrogenated product of a block copolymer comprising a polymer block A composed mainly of a vinly-substituted aromatic hydrocarbon and a polymer block B composed mainly of a material selected from the group consisting of butadiene, isoprene and a combination thereof.

8. The composition according to claim 7, wherein the polymer block A composed mainly of a vinyl-substituted aromatic hydrocarbon, which is one component of the hydrogenated block copolymer (a), is one composed mainly of styrene.

9. The composition according to claim 8, wherein the hydrogenated block copolymer (a) is a hydrogenated product of a block copolymer in which the number average molecular weight is 70,000 to 500,000 and the amount of 1,2-vinyl bond in the polymer block B composed mainly of butadiene is 25 to 45 mole %.

10. The composition according to claim 1, wherein the polyphenylene ether resin (b) is poly(2,6-dimethyl-1,4-phenylene) ether, a copolymer of 2,6-dimethyl-phenol with 2,3,6-trimethylphenol or mixture thereof.

11. The composition according to claim 1, wherein the non-aromatic softening agent for rubber (c) is a paraffin type oil.

12. The composition according to claim 11, wherein the non-aromatic softening agent for rubber (c) is a paraffin type oil in which the content of aromatic components is substantially 0.3% or less as analyzed by the method of ASTM 2140-63T.

13. The composition according to claim 1, wherein the polyolefin resin (d) is isotactic polypropylene.

14. The composition according to claim 1, wherein the polyolefin resin (d) is high-density polyethylene.

15. The composition according to claim 1, wherein the polyolefin resin (d) is super-high-molecular-weight high-density polyethylene having a viscosity average molecular weight of 1,000,000 or more.

16. The composition according to claim 1, wherein the polystyrene resin (d) is one of polystyrene, poly(α-methylstyrene) and poly(p-methylstyrene).

17. The composition according to claim 1, wherein said composition contains 100 to 500 parts by weight of the non-aromatic softening agent for rubber (c) per 100 parts by weight of the hydrogenated block copolymer (a).

18. The composition according to claim 1, further comprising inorganic fillers, flame retardants, glass fibers, carbon fibers, antioxidants, ultraviolet absorbers, hindered amine type light stabilizers, electroconductive fillers or coloring agents.

19. An composition having a compression set (JIS K 6301; 100° C.×22 hours; and compressiblity, 25%) of 65% or less as rubber, which comprises:

(a) 100 parts by weight of a hydrogenated block copolymer obtained by hydrogenating a block copolymer comprising at least two polymer blocks A composed mainly of a vinyl-substituted aromatic hydrocarbon and at least one polymer block B composed mainly of a conjugated diene, (b) 11 to 233 parts by weight of a polymer selected from the group consisting of a homopolymeric polyphenylene ether resin, a copolymeric polyphenylene ether resin and combinations thereof, comprising a binding unit represented by the general formula,

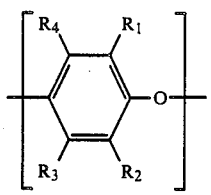

wherein $R_1$, $R_2$, $R_3$ and $R_4$, which may be the same or different, represent substitutents selected from the group consisting of hydrogen, halogen, hydrocarbon groups and substituted hydrocarbon groups, and having a reduced viscosity in a range of from 0.15 to 0.70 as measured at 30° C. in a 0.5 g/dl chloroform solution, (c) 10 to 500 parts by weight of a non-aromatic softening agent for rubber, and (d) 5 to 150 parts by weight of a resin selected from the group consisting of a polyolefin resin, a polystyrene resin and a combination thereof.

* * * * *